United States Patent
Simmons et al.

(10) Patent No.: US 7,504,084 B2
(45) Date of Patent: Mar. 17, 2009

(54) HIGH VELOCITY, LOW PRESSURE PROCESS FOR MAKING SILICA GELS AND MICROGELS

(75) Inventors: Walter N. Simmons, Durham, NC (US); Walter J. Simmons, Martinsburg, WV (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 457 days.

(21) Appl. No.: 11/292,012

(22) Filed: Dec. 1, 2005

(65) Prior Publication Data
US 2006/0124265 A1 Jun. 15, 2006

Related U.S. Application Data

(60) Provisional application No. 60/632,174, filed on Dec. 1, 2004.

(51) Int. Cl.
*C01B 33/142* (2006.01)
*C01B 33/143* (2006.01)

(52) U.S. Cl. ............... 423/338; 423/325; 423/335; 516/111

(58) Field of Classification Search ........... 423/325, 423/335, 338; 516/111
See application file for complete search history.

(56) References Cited

U.S. PATENT DOCUMENTS

| | | | |
|---|---|---|---|
| 4,163,712 A | 8/1979 | Smith | 210/7 |
| 4,954,220 A | 9/1990 | Rushmere | 162/168.3 |
| 5,057,230 A | 10/1991 | Race | 210/758 |
| 5,279,807 A | 1/1994 | Moffett et al. | 423/338 |
| 5,312,595 A | 5/1994 | Moffett et al. | 422/129 |
| 5,503,820 A | 4/1996 | Moffett et al. | 423/333 |
| 5,648,055 A | 7/1997 | Moffett et al. | 423/328.1 |
| 5,853,616 A | 12/1998 | Moffett et al. | 252/315.5 |
| 6,060,523 A | 5/2000 | Moffett et al. | 516/110 |
| 6,241,897 B1 | 6/2001 | Hanson et al. | 210/739 |
| 6,274,112 B1 | 8/2001 | Moffett et al. | 423/338 |
| 6,406,594 B1 | 6/2002 | Palmer et al. | 162/181.7 |
| 6,494,991 B1 | 12/2002 | Palmer et al. | 162/181.6 |
| 6,623,555 B1 | 9/2003 | Haverinen et al. | 106/465 |

(Continued)

FOREIGN PATENT DOCUMENTS

CA 2 300 615 9/2000

(Continued)

OTHER PUBLICATIONS

Barker G., et al., *J. of Food Engineering*, v52, (2002), 405-502.

(Continued)

*Primary Examiner*—Steven P Griffin
*Assistant Examiner*—Dennis Cordray
(74) *Attorney, Agent, or Firm*—Shiela Loggins

(57) ABSTRACT

This invention relates to a process for converting silica to polysilicate gels or hydrogels by combining an aqueous silica source with a $CO_2$ feed stream as the gel initiator, whereby the reaction stream is propelled at high velocity and turbulence maintaining the $CO_2$ uptake rate in the reaction stream. The invention also relates to a process for converting silica to polysilicate by pre-carbonating water at pressures of equal to or greater than 100 psig before initiating the polysilicate reaction.

21 Claims, 2 Drawing Sheets

U.S. PATENT DOCUMENTS 6,827,916 B2 12/2004 Guo et al. ............ 423/335
2004/0238137 A1* 12/2004 Donnelly et al. ......... 162/164.1

FOREIGN PATENT DOCUMENTS

GB          1 455 567        11/1976

OTHER PUBLICATIONS

Caroll, J., et al. *J. of Physical and Chemical Reference Data*, v20, (1991), 1201-1208.

Crovetto, R. et al., *J. of Physical and Chemical Reference Data*, v20, (1991), 575-589.

* cited by examiner

HIGH VELOCITY, LOW PRESSURE PROCESS FOR MAKING SILICA GELS AND MICROGELS

This application claims the benefit of Provisional Application No. 60/632,174, filed Dec. 1, 2004 herein incorporated by reference.

FIELD OF THE INVENTION

This invention relates to a process for converting silica to polysilicate gels or hydrogels by combining an aqueous silica source with a $CO_2$ feed stream as the gel initiator, whereby the reaction stream is propelled at high velocity and turbulence maintaining the $CO_2$ uptake rate in the reaction stream. The invention also relates to a process for converting silica to polysilicate by pre-carbonating water at pressures of equal to or greater than 100 psig before initiating the polysilicate reaction.

DESCRIPTION OF THE RELATED ART

Cellulosic products can be made using conventional fillers more economically than products made without such fillers, primarily because of the cost of cellulosic material. An important filler for such purposes is silica and silicates. For the purposes of the invention, polysilicate gels are of particular interest. In addition to fillers for paper, silica and silicates have also been previously used as retention aids, buffers, chelating agents, and coating components for making paper products.

Polysilicate gels or hydrogels are also well known in the art. These gels can be prepared by gelation of an alkali metal silicate by mixing the silicate with a gel initiator usually in water or water-based solution and aging the mixture to allow for partial or complete gel formation. Polysilicates can be particles, which are small as in the case of microgels which range from 1-2 nanometers. These small particles are stabilized to prevent further growth or gelation. See, for example, U.S. Pat. Nos. 4,954,220, 5,279,807 and 5,312,595. Neutralization of alkali silicate solutions forms polysilicic acid (from polymeric anions), which polymerizes to form microgels comprising three dimensional aggregates of very small particles of polysilicic acid. The formation of polysilicate microgels is initiated by the addition of an acidic material. In the case of microgels, the polymerization process is stopped before total gelation of the solution thus limiting the size of the particles. The initiator starts the gelation or polymerization process of the silicate. Polysilicates can also be larger sized particles where the gelation is allowed to go to varying degrees of completion. In this case, these larger sized particles can be reduced in size to a range of 0.1 to 10 microns by pulverizing or shearing the formed gel.

Gel initiators are commonly referred to as "neutralizing agents" and/or "activating agents". Mineral acids and alum are the most commonly employed gel initiators. Organic acid such as carbonic acid or carbon dioxide dissolved in water are also known as activating agents or gel initiators. For the purposes of the invention, $CO_2$ is of particular interest as the gel initiator. Normally, the use of carbon dioxide requires that the reaction be run at high pressures in order to dissolve a sufficient amount of $CO_2$ in the reaction medium to cause the alkali metal silicate to polymerize and form the polysilicate.

The resulting gels, microgels and colloids have commercial utility as drainage and retention aids in papermaking, as flocculation agents in potable water purification plants and as fillers used to form paper or cellulosic products.

Several practical factors currently limit commercial use of polysilicate gels, although they are excellent flocculants, environmentally benign and good fillers in cellulosic materials. For example, gel solutions are necessarily dilute, making it impractical to ship large volumes long distances. Therefore, gels are typically produced onsite by the user. These gels are prone to form silica deposits in equipment used to prepare the product. These problems can be overcome by equipment design and trained personnel in a factory environment, but present greater difficulty in field applications where the equipment should be relatively easy to operate and maintain. Furthermore the use of $CO_2$ as gel initiator at high pressures during the formation of the polysilicate requires special equipment and safety precautions.

The inventors have surprisingly discovered a method for preparing polysilicate using carbon dioxide as the initiator at low pressures.

There are numerous patents describing the generation of polysilicate gels.

U.S. Pat. No. 4,954,220 discloses an extensive list of gel initiators for the conversion of silicate to polysilicate reaction.

U.S. Pat. Nos. 5,279,807; 5,503,820; 5,648,055; and 5,853,616 disclose improved continuous processes for preparing polysilicate microgels wherein silica deposition is greatly reduced by mixing at high Reynolds numbers a soluble silicate solution and a strong acid as initiator.

U.S. Pat. No. 6,060,523 discloses a continuous process for preparing polysilicate microgels wherein elastically deformable vessels are incorporated into the process. Such vessels enable dislodging of deposits formed on vessel walls.

U.S. Pat. No. 6,274,112 discloses a continuous process for preparing silica microgels using carbon dioxide as gel initiator at a pressure of at least 25 psig.

U.S. Pat. Nos. 6,494,991 and 6,406,594 describe processes for the formation of silica/silicate networks about cellulosic material using precipitated carbonate filler and silicate solution initiated with carbon dioxide.

U.S. Pat. No. 6,623,555 describes a method of making a composite pigment of precipitated calcium carbonate and a silicon compound.

Furthermore, there are numerous articles and patents which discuss the carbonation of water.

Barker G., et al., *J. of Food Engineering*, v52, (2002), 405-502 describes optimized parameters for high pressure carbonation.

Carol J., et al. *J. of Physical and Chemical Reference Data*, v20, (1991), 1201-1208 reviews the literature for the solubility of carbon dioxide in water at pressures below 1 Mpa.

Crovetto, R. et al., *J. of Physical and Chemical Reference Data*, v20, (1991), 575-589 reviews the solubility of the CO2-H2O from 273 to the critical point of water.

U.S. Pat. Nos. 5,057,230, 6,241,897, 4,163,712 and Great Britain Pat. No. 1,455,567 describe introducing a gas into a liquid under turbulent conditions or under high velocity in order to increase the solubility of the gas in the liquid. The method is applied to sewage systems or fish farming.

The inventive process also provides sufficient mixing of dilute solutions of silicate. The high dissolution of carbon dioxide and rapid mixing of the reaction mixture is achieved by propelling the reaction mixture of combined feed streams of carbon dioxide and an aqueous silicate source at a high velocity and turbulence to cause an effective amount of $CO_2$ uptake in the reaction for gel initiation.

SUMMARY OF THE INVENTION

The process of the invention is directed to the preparation of polysilicate gels.

Accordingly disclosed is, a process for preparing polysilicate gels comprising:

(a) contacting a first feed stream wherein the first feed stream comprises a silica source selected from the group consisting of an aqueous solution of a water-soluble silicate, a colloidal silica sol, and combinations thereof with a second feed stream comprising $CO_2$ to form a reaction stream, and (b) maintaining the velocity and turbulence of the reaction stream with at least one propelling device wherein the propelling device propels the reaction stream along a reaction vessel and the turbulence is at least 2300 reynolds number or the velocity is at least about 3 ft/sec.

Preferably the polysilicate formation occurs at a pressure of about less than 25 psig.

The second feed stream comprising carbon dioxide may contain free carbon dioxide, typically in the form of a gas or liquid or alternatively a pre-carbonated water stream may make up the second feed stream. However, to maximize dissolution of the carbon dioxide within the reaction mixture additional feed streams of carbon dioxide can be added to the propelled reaction stream at spaced intervals along a reaction vessel or vessels, preferably an elongated reaction vessel. The possible additional carbon dioxide streams along the elongated reaction vessel(s) helps ensure good mixing of the reaction mixture and a sufficient supply of $CO_2$ for continual gelation as the reaction mixture moves through the elongated reaction vessel. Additionally, more than one propelling device may be spaced at intervals along the elongated reaction vessel in order to maintain high velocity and turbulence. The propelling of the reaction at various intervals along the reaction vessel helps to insure that a sufficient amount of $CO_2$ stays in solution as the reaction mixture moves through the elongated vessel(s). The shearing action of the propelling device causes dispersion of the entrained bubbles in the oncoming reaction stream into a multitude of finer bubbles increasing the amount of $CO_2$ available for uptake in the reaction stream and thus available for initiation of polysilicate formation. This process allows formation of polysilicate via a $CO_2$ gel initiator at considerably lower pressures than required in earlier processes, a significant safety advantage. The propelling of the reaction stream at high turbulence and high velocity also helps to prevent the depositing of solid silicate or polysilicate onto the walls of the reaction vessel(s) and plant equipment. Advantages of the instant process also include better pH control during the step where the feed streams are contacted, as strong mineral acids are not used in the process, providing safety benefits as well as lower equipment costs, improved ability to remove silica deposits, and more efficient mixing of dilute solutions of silicate and carbon dioxide initiator.

High velocity for the purposes of the invention refers to the speed with which the reaction stream moves through the vessel and is related to the throughput of the reaction stream through the vessel. The throughput is at least about 20 gallons per minute (75.7 l/min.), preferably the throughput is at least about 30 gallons per minute (113.5 l/min.), and most preferably the throughput is at least about 40 gallons per minute (151.3 l/min.).

Throughput for the purposes of the invention is meant the amount of reaction stream that passes a set point in the reaction vessel.

When the diameter of the reaction vessel(s) is 2.0 inches and the throughput is 30 GPM and the viscosity is constant, the velocity of the reaction stream is approximately 4.8 ft/sec. The velocity of the reaction stream is at least about 3 ft/sec, preferably 4 ft/sec and most preferably 4.5 ft/sec.

High turbulence for the purposes of the invention is dependent on the velocity of the reaction stream provided the viscosity of the reaction stream remains constant. The turbulence of the reaction stream is at least 2300 Reynolds number, preferably at least about 3000 Reynolds number and most preferably at least about 3500 Reynolds number.

The above process description is ideally suited to a continuous process but may also be applicable to a batch process.

A further embodiment of the inventive process comprises an aqueous pre-carbonation step at pressures from at least 25 to about 300 psig before initiation of the polysilicate formation.

For the purposes of the invention, the pre-carbonation step means treating an aqueous solution under pressures from at least 25 to about 300 psig and preferably above 100 psig. The carbonated water can be stored under high pressure to ensure that the carbonated water stays highly carbonated before use in initiation of the polysilicate formation. However, at the time the pre-carbonated water is mixed with the silicate stream to form the reaction stream, the pre-carbonated water is no longer under high pressure and generally the pressure of the combined streams of aqueous silicate and aqueous pre-carbonated stream will be under 25 to 20 psig.

This low pressure during formation of the polysilicate in the reaction stream occurs under a pressure not exceeding 25 psig and is one of the advantages of the present invention.

Accordingly, disclosed is the process according to steps (a) and (b) above wherein the second feed stream comprises free carbon dioxide or a pre-carbonated aqueous stream.

The pre-carbonation of the second feed stream before step (a) comprises the step of pre-carbonating a water feed stream under a pressure equal to or greater than about 25 psig.

When the pre-carbonation step is combined with the first embodiment of the invention as in steps (a) and (b) the pressure of the pre-carbonated second feed stream before contacting the first feed stream of step (a) is introduced into the feedstream at a pressure which is lower than the pressure used in the pre-carbonation step. The terms "lower pressure" is intended to mean pressures under 25 psig. For example, the pressure in the reaction stream is approximately 20 psig.

This pre-carbonation step provides multiple advantages such as removal of substantial amounts of minerals in the water allowing for a faster, cleaner and more controllable reaction with the silicate; the removal of minerals helps to lessen the chance of gelled material clogging the reactor; the removed minerals by pre-carbonation can be purged through the reactor to clean the reactor walls reducing the requirement for more complex cleaning equipment; and finally, since high pressures are only used during the pre-carbonation step and the actual silicate solution and polysilicate reaction is not exposed to pressures exceeding 20 psig, the polysilicate formation is safer. The pre-carbonation process is applicable to the synthesis of polysilicate microgels, colloidal silica gels and any complete or partial generation of polysilicate hydrogels.

The present invention and its particular embodiments provide advantages which are applicable to a continuous process or a batch process for preparing silica gels.

BRIEF DESCRIPTION OF THE DRAWINGS

The present invention is more clearly understood when reference is made to the accompanying drawing in FIG. 1. FIG. 1 is a schematic diagram of the preparation of polysilicate gel by the process of the invention. In the polysilicate formation schematic shown in FIG. 1, 20 is a silicate source that may be an aqueous solution of a water-soluble silicate, a colloidal silica sol, and combinations thereof 22 is a silicate flow meter and 24 a silicate pump. The silicate pump in this instance is a centrifugal pump which shears the silicate solution and propels this first feed stream along a reaction line before combining with a gelation initiator. 26 indicates a water source line and 28 a water flow meter. The water is also subjected to shearing and propelling through pump 30 before entry of $CO_2$ into the water. Once the $CO_2$ is introduced into the line at 74, the water undergoes pre-carbonation within the pre-carbonation loop represented by 34. Typically this pre-carbonation step is carried out in a relatively long "pre-carbonation" loop where the $CO_2$ and water are pressurized under pressures of at least about 100 psi. The length of the loop and pressure will determine the amount of $CO_2$ dissolved in the water. In this particular example the length of the pre-carbonation loop is 400 feet long and the internal diameter of the hose is 2 inches. Numbers 32 and 36 represent a water check valve and a pre-carbonation pressure control valve respectively. Once the water has undergone pre-carbonation through loop 34, the pressure of the carbonated water is lowered to about 20 psi at point 36 before combining with the propelled silicate source from pump 24. Point 38 is a pressure transmitter for the first reaction stream loop 40. This pressure transmitter indicates the pressure at the beginning of the reaction (no more than about 20 psi) after combination of the pre-carbonation feedstream and the propelled silicate source. Ideally the drop in pressure at the beginning of the reaction stream loop 40 and at the end of loop 40 should be a minimum, the minimum being determined by the length of the reaction loop and the velocity of the reaction stream. In example 2, the length of the reaction loop is a hose of 2 in. internal diameter and approximately 200 feet long, the velocity of the reaction is approximately 5 ft./sec and a throughput of approximately 50 gallons per minute (GPM) and the pressure drop from the beginning of the reaction stream loop 40 and end of the reaction stream loop 40 is approximately no greater than 20 psi. After the first reaction stream loop 40, the reaction stream is propelled through a second centrifugal pump 42 which shears the reaction mixture to disperse the $CO_2$ in the reaction solution into finely dispersed bubbles thus increasing the surface area of the fine bubbles and enhancing the $CO_2$ uptake into the reaction solution and subsequent availability for initiation. Pump 42 also ensures a turbulence of at least 2300 Reynolds No. and the reaction stream is kept at a velocity of approximately 5 ft./sec with a throughput of approximately 50 GPM as the reaction stream passes through reaction loop 50. A third reaction loop 60 and a fourth reaction loop 70 are figured in this particular embodiment. Each reaction loop (60 and 70) is also preceded by centrifugal pumps 52 and 62 and pressure transmitters 54 and 64 respectively. Each reaction loop (50, 60 and 70) is also preceded by an additional carbon dioxide stream line (48, 58 and 68) regulated by control valves 49, 59 and 69 and by check valves 46, 56 and 66 as the reaction stream enters reaction loops 50, 60 and 70. These $CO_2$ control valves allow for more $CO_2$ to enter the particular reaction loop in the event the reaction needs more $CO_2$ to lower the pH of the reaction stream. The additional pumps 52 and 62 provide high shear and turbulence as described above for 42 along the full length of each reaction loop. Once the reaction stream has passed through reaction loops 40, 50, 60 and 70 the reaction is essentially about 70% complete and the pH is approximately 7. The polysilicate is then discharged 72 to a storage or aging tank where the gel can be further treated or processed. For example, the gel may be sheared to reduce particle size, and/or diluted or pH adjusted to slow down or stop any further polymerization.

Figure 1:
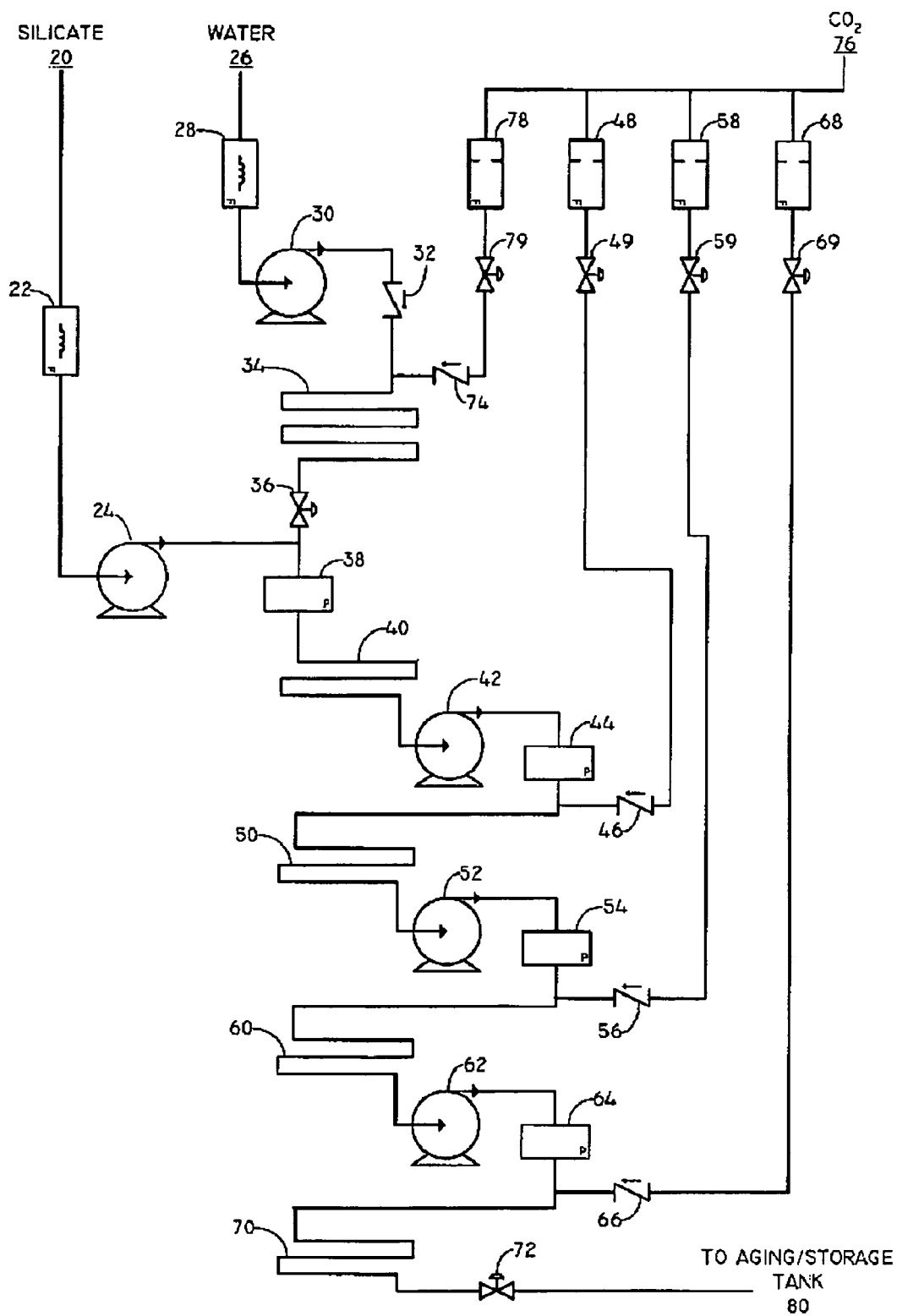
FIG. 1 is for the purposes of illustration a representation of only one particular embodiment of the invention and does not limit the scope of the invention as other configurations can be imagined.

Other schematics of FIG. 1 can also be envisioned such as additional or fewer reaction loops, with or without the pre-carbonation loop, no additional $CO_2$ streams (46, 56 and 66), less than 3 additional $CO_2$ streams or more than 3 additional $CO_2$ streams. The polysilicate reaction can be carried to completion or be only partially complete. The length of the reaction loops may be longer or shorter than 200 feet. The length of the pre-carbonation loop may be more or less than 400 feet long. The diameters of the hoses used in the pre-carbonation loop and reaction loops may be greater or less than 2 inches.

Figure 2:
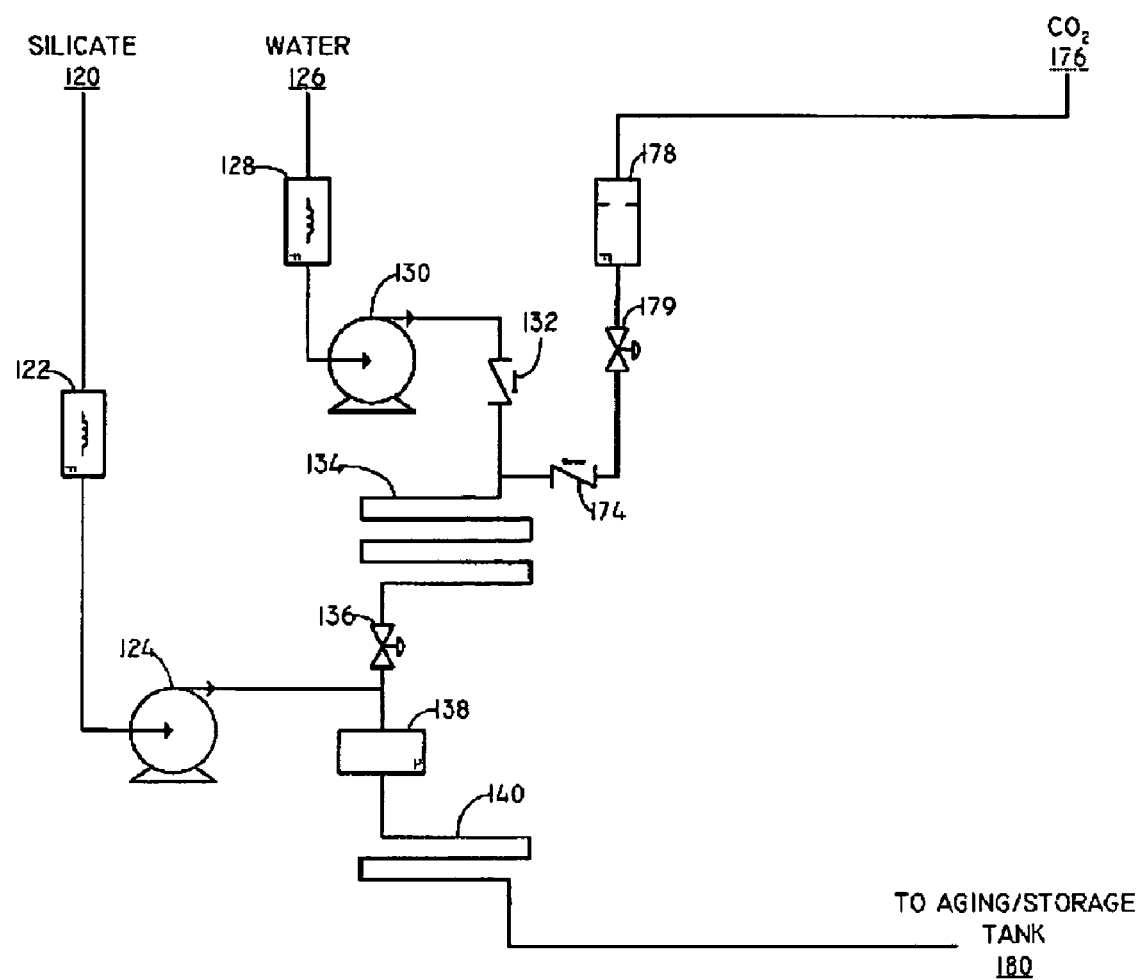
FIG. 2 embodies the pre-carbonation of a water solution which may be part of the process as described in FIG. 1. This pre-carbonation step may also be alternatively carried out before other polysilicate preparation processes such as those described in U.S. Pat. Nos. 6,274,112 and 6,060,523 herein incorporated by reference.

FIG. 2 is a schematic of the pre-carbonation step for the purposes of preparing polysilicates. As discussed above, this pre-carbonation process can be used as a pre-step in preparing carbonated water at high pressures before polysilicate formation in order to obtain high concentration of dissolved $CO_2$ before combining with the silicate solution. This pre-carbonation may be done at pressures ranging from about 100 psi to 300 psi then dropping the pressure to no greater than about 20 psi during the actual polysilicate formation. In the polysilicate formation schematic shown in FIG. 2, I20 is a silicate source that may be an aqueous solution of a water-soluble silicate, a colloidal silica sol, and combinations thereof. I22 is a silicate flow meter and I24 a pump. The pump in this instance is a centrifugal pump which shears the silicate solution and propels this first feed stream along a reaction line before combining with a gelation initiator. I26 indicates a water source line and I28 a water flow meter. The water is also subjected to shearing and propelling through pump I30 before entry of $CO_2$ into the water. Once the $CO_2$ is introduced into the line at I74, the water undergoes pre-carbonation within the pre-carbonation loop represented by I34. Typically this pre-carbonation step is carried out in a relatively long "pre-carbonation" loop where the $CO_2$ and water are pressurized under pressures of at least about 25 psi to about 300 psi. The length of the loop, pressure and temperature will determine the amount of $CO_2$ dissolved in the water. In example 1 in the disclosure, the length of the pre-carbonation loop is about 400 feet long and the internal diameter of the hose is about 2 inches. Numbers I32 and I36 represent a water check valve and a pre-carbonation pressure control valve respectively. Once the water has undergone pre-carbonation through loop I34, the pre-carbonated water is combined with the silicate feed stream propelled through pump I24. Point I38 is pressure transmitter for a reaction stream loop I40. After the reaction, the formed polysilicate may be discharged to an aging or storage tank I80 where the product may be further treated.

The reaction conditions for loop 140 may be run at virtually any pressure, temperature or desired conditions.

DETAILED DESCRIPTION OF THE INVENTION

Polysilicate gels are aqueous solutions formed by the complete or nearly complete gelation of a silica source, for example, a water-soluble silicate, a colloidal silica sol, or combinations thereof.

Water-soluble silicates include alkali metal silicates and polysilicates, such as sodium silicate, having in its most common form one part $Na_2O$ to 3.3 parts $SiO_2$ by weight. The gels formed from soluble silicates typically are composed of water and linked silica particles having a surface area of at least 500 $m^2/g$, more typically of at least 1000 $m^2/g$ for gels.

Preferably, the silica source is an aqueous solution of a water-soluble silicate.

Colloidal silica sols are commercially available. Silica sols useful in this invention are composed of water and discreet silica particles having a diameter of 4 to 60 nm, preferably less than 50 nm. The sol particles also link together during partial gelation to form aggregates having three-dimensional networks and chains. Gels can also be formed from silica sols using the inventive process and will typically have a surface area in the range of about 50 to 1000 $m^2/g$.

At a pH below 5, polysilicate gels sometimes are referred to as polysilicic acid gels. As the pH value is raised, these products can contain mixtures of polysilicic acid and polysilicate gels, the ratio being pH-dependent. As used herein, the term "polysilicate gel" or "silica gel" includes such mixtures of polysilicic acid and polysilicate gels.

Polysilicate gels frequently are modified by incorporating aluminate ions into their structure. The aluminum may be present throughout the polysilicate aggregates, or only on their surface, depending on where the aluminum source is added in the process. Aluminum may be added to increase the rate of gel formation, and thus to decrease the reaction time. Aluminum added as aluminate also allows the gel to retain its charge at low pH conditions. Silica sols may have aluminum incorporated in the sol particles. As used herein, the term "polysilicate gel" or "silica gel" includes polysilicate gels or microgels containing aluminum, which are sometimes referred to in the art as polyaluminosilicate microgels.

In the present invention, a feed stream comprising a silica source, the "silica feed stream or first feed stream", is contacted with a feed stream comprising carbon dioxide. The silica source is selected from the group consisting of an aqueous solution of a water-soluble silicate, a colloidal silica sol, and combinations thereof.

The silica feed stream can comprise any conventional water-soluble silicate solution and/or colloidal silica.

When the silica feed stream comprises a water-soluble silicate solution, the silica stream should have a silica concentration in the range of 0.5 to 15%, preferably 1% to 10%, and most preferably 1 to 5%, by weight. The polysilicate gel generally will be formed too slowly for practical use at concentrations below 0.5%. Above 15% silica, the rate of gelation is too fast to effectively control when using a water-soluble silicate. Commercial silicate solutions having higher silica concentrations can be used with appropriate dilution by adding water to reduce the silica concentration.

When the silica feed stream comprises a colloidal silica sol, in the absence of a water-soluble silicate, the silica stream can be used without dilution. The silica concentration in the feed stream can be the same as the silica concentration in the silica sol, or less. Preferably the silica concentration in the silica feed stream is in the range of 15% to 50%, by weight, when a colloidal silica sol is used, in the absence of a water-soluble silicate.

The feed streams and reaction loops can be carried out in any suitable contacting vessel, such as a tank, pipe, tube, hose, continuous stirred tank, plug flow reactor, tubing, or combinations thereof. The term "vessel" denotes a hollow subject used for fluid, especially liquid.

The elongated reaction vessels may be conventional reaction vessels but preferably the elongated reaction vessels are tubing, piping or hosing. For example, the length of the elongated reaction vessels or reaction loops can be about 200 ft and a diameter of approximately 2 inches. The length and diameters of the reaction vessel can vary. However, the internal diameter of the elongated reaction vessel, and viscosity of the reaction stream will affect the velocity and turbulence of the reaction stream. The internal diameter of the elongated reaction vessel should be of such a size as to allow a velocity or a throughput of at least about 20 GPM.

As diameter of the elongated reaction vessel affects turbulence and the dissolution of $CO_2$ in the reaction medium is favored by turbulence, the internal diameter should also be sized to provide a Reynolds number of at least 2300. Length of the reaction loop should be limited to keep pressure drop in the reaction loops of less than 20 psi. This allows for consistent $CO_2$ uptake rate and lower potential overall operating pressures.

For the purposes of the invention the progression of the reaction stream along the reaction loops should be maintained at a substantially constant velocity and a turbulence of at least about 2300 Reynolds number.

An important element of the invention requires that the reaction stream be propelled at sufficient velocity and turbulence so as to effect a fine dispersion of $CO_2$ bubbles within the reaction stream and maintain a velocity of the reaction stream so as to ensure a minimum drop of equal to or less than 20 psi within the reaction loop and a turbulence of at least 2300 Reynolds number. Preferably the Reynolds number within the reaction loop is maintained at a value of at least 3000 and most preferably at a value of at least 3500 Reynolds number.

This turbulence is achieved at relatively low pressure. For example, at pressures lower than 25 psig or preferably at pressures about 20 psig or lower.

The shearing action by the pump(s) on the reaction stream helps to disperse the dissolved $CO_2$ in the reaction into finely dispersed bubbles of carbon dioxide thus helping to maintain the dissolution of $CO_2$ in the reaction mixture and thoroughly mixing the reactants. The pumping action also helps to prevent any build-up of silicate deposits in the reaction line.

As described in the Brief Description of the Drawings the reaction of the silica or silicate with $CO_2$ dissolved in water may be carried out in an elongated reaction loop, wherein the reaction mixture in the reaction loop or loops is propelled by a pump or series of pumps until the reaction mixture is aged sufficiently to give the desired degree of polysilicate formation and/or sufficient $CO_2$ has reacted to obtain the desired gellation rate.

The propelling device may be any pump able to propel the reaction mixture and simultaneously reduce the $CO_2$ bubble size. In particular, a centrifugal or shear pump is preferred. As mentioned previously, the propelling device(s) maintain the turbulence and velocity of the reaction stream along the reaction loop(s) and maintain a fine dispersion of $CO_2$ bubbles in the reaction solution while in the reaction loops.

As also indicated in the Brief Description of the Drawings, additional $CO_2$ gas may be injected into the reaction loop(s).

This $CO_2$ will enter the system at a high velocity relative to any movement of the reaction stream along the reaction loop thereby subjecting the reaction to additional shearing action that also helps to disperse the entrained bubbles in the incoming stream into a multitude of fine bubbles. The shearing action and injection of $CO_2$ into the reaction stream within the reaction loop(s) help to achieve rapid solution of the fine bubbles as fine bubbles enhance surface to volume ratio and thus dissolution. The precise size of the fine bubbles required to ensure that substantially all the $CO_2$ gas dissolves within the reactant medium depends on several factors: the rate of movement of the volume and the degree of turbulence and shear in the volume, the initial $CO_2$ concentration and the fluid temperature. Lower temperature favors better solubility of the $CO_2$ in water. A typical size range for the fine bubbles after passing the reaction stream through the propelling device(s) ranges from an average diameter of between $1 \times 10^{-3}$ l and $5 \times 10^{-4}$ l, preferably an average diameter of not greater than about $7 \times 10^{-4}$ l.

The propelling/shearing devices accomplish both vigorous mixing of the reactants and a concentration of about 0.5 to 5.0 g/L carbon dioxide in the reaction stream, preferably about 1.0 g/L to 5.0 g/L, and most preferably about 2.0 g/L to 5.0 g/L concentration of carbon dioxide in the reaction stream. This concentration of course, will be affected by the temperature of the reaction solution.

The carbon dioxide is present in an amount needed to neutralize the alkalinity of the silica solution to a pH of at least about in a range of 6 to 10, preferably 6.5 to 8.5, and most preferably 6.5 to 7.5 when carbon dioxide is used in the absence of additional gel initiators.

The optional pre-carbonation step is done at pressures of at least about 25-300 psi. This pre-carbonation step is able to achieve a concentration of from about 2 g/L to about 11 g/L depending upon the pressure. Preferably the concentration is about 5 g/L to about 11 g/L.

The silica first feed stream is contacted with a second feed stream comprising carbon dioxide as a gel initiator in a continuous or batch process, which initiates formation of the gel. The feed-stream of carbon dioxide may be free carbon dioxide in the form of a gas or liquid in the feed stream, other components, liquids or gases may also be present in the carbon dioxide feed stream.

The flow rates of the silica and carbon dioxide feed streams may be controlled volumetrically (typically within the pH range of 6 to 10) due to the buffering effect of resulting carbonates. Volumetric control offers the advantage of avoiding pH sensors, which may require frequent cleaning, calibration, and replacement.

Additional gel initiators may be added, for example, aluminum compounds, especially when preparing polyaluminosilicate solutions, which may lower the pH. Other gel initiators may also be fed to the reactor, either with the carbon dioxide feed stream, or as a separate stream. These include for example, inorganic and organic acids, such as sulfuric and acetic acids, acid salts, such as borax, sodium bisulfite, ammonium sulfate, alkali metal salts of amphoteric metal acids, such as sodium aluminate and certain organic compounds, such as organic anhydrides, amides and esters. A more complete list of gel initiators is provided in U.S. Pat. No. 4,954,220.

Since $CO_2$ contacts the silica feed stream at the various junctions along the reaction stream, preferably $CO_2$ is added in 100 to 500% of the stoichiometric amount needed to neutralize the silica alkalinity.

By silica alkalinity, it can be the alkalinity of an aqueous solution of a water soluble silicate, e.g., of a solution of an alkali metal silicate, such as sodium silicate. These solutions are basic and gel initiators are typically acidic. Water-soluble silicates are distinguished by their ratio of silica to alkali, wherein the alkali is of the formula $M_2O$ and M is typically Na, K, or $NH_4$. Alternatively, silica alkalinity can mean the alkalinity of a colloidal silica sol. In a silica sol, the silica particles are dispersed in an alkaline medium, which stabilizes the particles to gelation. The alkaline medium can contain, for example, sodium or ammonium hydroxide.

Preferably carbon dioxide will be used in the absence of other gel initiators and the feed rate of carbon dioxide will be in excess of the solubility of carbon dioxide in water at the given pressure and temperature. As temperature increases, solubility of carbon dioxide decreases.

The temperature for carrying out the process is typically in the range of from about 0° C. to about 50° C. The preferred temperature for carrying out the process is in the range of from about 0° C. to about 30° C.

Optionally, an aluminum salt or an alkali metal aluminate, is conveniently added as a soluble component in the silicate solution, or may be added as a separate stream to the mixture. Excellent polyaluminosilicate gels contain an $Al_2O_3/SiO_2$ mole ratio in the range of 1:1500 to 1:25, preferably 1:1250 to 1:50. Generally up to 25% of surface silicon can be replaced by aluminum.

The reaction propelling devices and $CO_2$ entry points along the reaction loops can be modified with nozzles to increase turbulence and thus help to effect mixing and dissolution of $CO_2$.

After the contacting step, the reaction stream containing both the silica source and $CO_2$ should have a silica concentration of about 0.5 to about 15 wt %, preferably 1 to 10 wt %, most preferably 1 to 5 wt % based on the total weight of the mixture. When the silica feed stream comprises a colloidal silica sol in the absence of a water-soluble silicate, the mixture can have a higher silica concentration, i e., a silica concentration equal to the silica concentration in the silica sol or less, preferably a silica concentration in the range of 15% to 50%, by weight. The pH should be in a range of 6 to 10, preferably 6.5 to 7.5, when carbon dioxide is used in the absence of additional gel initiators.

The polysilicate of the invention is partially gelled. Generally, the gelation is about 70% complete. At this point the partially gelled material is sent to a storage tank where is continues to substantially complete gelation.

The time taken to achieve the desired gelation will vary depending upon the temperature and concentration of $CO_2$ and silica. For about 70% gelation, the reaction takes from about 30 seconds to 5 minutes. Example 2, takes approximately 2 minutes.

The treated gel, that is, after dilution or pH adjustment may then be stored or consumed in its intended use. Alternatively, if the gel is consumed immediately, or if further gelation will be within acceptable limits for the intended application, it may not be necessary to dilute or adjust pH of the gel. If desired, the aged gel may be filtered to remove unacceptably large silica deposits that were dislodged while practicing the invention. The gel may also be sheared to reduce particle size.

Polysilicate gels prepared in accordance with the invention may be used in conventional applications consuming such gels, as well as in new applications rendered practical because the gels can be reliably produced in the field. For instance, the gels may be used as a flocculating agent to remove solids from aqueous suspensions, or as a paper retention aid, fillers for paper and frequently in conjunction with other polymers and/ or chemicals used for that purpose.

Having described the invention, it now will be illustrated, but not limited, by the following examples.

EXAMPLES

Example 1

Precarbonation Conditions

A stream of $CO_2$ at 200 SL/min is combined with a stream of water flowing at 47.3 GPM (Gallons per minute) under 100 PSIG. The combined $CO_2$ and water travel through a pre-carbonation loop (2 in. internal diameter hose) of approximately 400 ft. The carbonated water travels at a velocity of approximately 4.8 ft/sec and takes approximately 82 seconds to complete the pre-carbonation loop. A concentration of at least 5 g/L of $CO_2$ in the water is reached at this retention time and 100 PSIG pressure.

Example 2

Silicate Reaction According to the Invention

As the pre-carbonated water exits the pre-carbonation reactor loop as in Example 1, the pressure is lowered to approximately 20 psig before merging with sodium silicate solution[1] pumped at a rate of approximately 2.7 GPM. The combined streams form a reaction stream entering a first reaction loop traveling at a velocity of about 4.8 ft/sec and an output of about 50 GPM. The time for completion of the first reaction loop is about 10 seconds[2]. The pressure at the beginning of the first reaction loop is about 10 psig. After completing the reaction loop the pressure drops to less than 20 psig. The reaction stream enters a pump that maintains the velocity of the reaction stream at about 4.8 ft/sec and an output of about 50 GPM. Carbon dioxide is replenished into the reaction stream at the beginning of the second reaction loop at a rate of 30 SL/min. The reaction stream continues to move through a series of two more a) replenishment carbon dioxide streams[3], b) pumps and c) reactor loops, all of which are connected in sequence until the reaction is complete. The flow of the reaction stream is maintained at a rate of 50 GPM and the pH is reduced to less than 7.5 before exiting the reactor system. The reaction time is complete within several minutes. A maximum pressure within the reactor loops is maintained at a pressure of no greater than 20 psi by changing the speed of the pumps. A turbulence value of greater than 2300 Reynolds is also maintained by the action of the pumps throughout the reaction loops.

1. A water soluble sodium silicate solution manufactured by PQ (manufactured by Philadelphia Quartz) "N" Grade giving approximately 2-3% concentration of soluble Si and 28.5% $SiO_2$.
2. The reactor loops 1, 2 and 3 are PVC hoses each of 100 foot length and 2 in inner diameter.
3. The replenishment flow of $CO_2$ in reaction loop 1 is 30 SL/min, loop 2 is 30/SL/min and loop 3 is 15/SL/min.

Lab Simulation of Process of the Invention for Generating Polysilicate 1 liter laboratory samples 3 thru 10 of the polysilicate were prepared by acidifying sodium silicate using carbon dioxide according to the invention. The high turbulence conditions of the invention (~2300 Reynolds number) process is simulated by injection of $CO_2$ gas into a reaction flask wherein the reaction mass is stirred at approximately 1000 RPMs.

The temperature of the reaction is varied from 25° C. to 65° C. The concentration of silica is also varied from 1 to a maximum of 3% based on weight. Aging of the polysilicate after the process of the invention was also varied from 1 to 72 hours. The samples were sheared for one minute at speed no. 4 using a POLYTRON homogenizer. Table 1 indicates the viscosity, surface area and S-values for the polysilicates of examples 3 thru 10.

TABLE 1

| Example | Reaction Temp. ° C. | Wt. % Silica | Aging Hrs | Viscosity[1] (mPas) | Surface[2] Area m²/g | S-Value[3] % |
|---|---|---|---|---|---|---|
| 3 (1) | 25 | 1 | 1 | 476 | 1191 | 2.722 |
| 4 (2) | 65 | 3 | 72 | 2195 | 1229 | 6.005 |
| 5 (3) | 25 | 3 | 48 | 2740 | 1268 | 5.856 |
| 6 (4) | 65 | 1 | 48 | 230 | 1306 | 3.197 |
| 7 (5) | 65 | 3 | 1 | 1790 | 1249 | 7.538 |
| 8 (8) | 45 | 2 | 72 | 1080 | 1325 | 4.018 |
| 9 (9) | 65 | 1 | 1 | 284 | 1025 | 2.934 |
| 10 (15) | 25 | 2 | 1 | 1220 | 1268 | 5.14 |

[1]Brookfield viscosity at 20 rpm using the largest spindle possible
[2]Determined by titration method of the silica surface with sodium hydroxide in a 20% aqueous sodium chloride medium between pH of 4 and 9. At pH 9, 1.26 hydroxyl ions are adsorbed per square millimicron of surface (Sears, G. W, Analytical Chemistry, (1956), Vol. 28, No. 12, p1981-1983).
[3]The S-value represents the amount of water bound to the surface of the polysilicate particle and is determined by the method of Iler et al. found in J. of Physical Chemistry, (1956), Vol. 60, p955-957.

Handsheet Testing

TABLE 2

| Example | Breaking[1] Length (m) | Tear Strength[2] mN | Scott Bond[3] J/m² | Ash Content[4] wt. % |
|---|---|---|---|---|
| 3 (1) | 2489.7 | 332.8 | 175.48 | 31.3 |
| 4 (2) | 2811.7 | 326.6 | 171.9 | 26.8 |
| 5 (3) | 2812.0 | 340.4 | 153.83 | 28.2 |
| 6 (4) | 2587.8 | 333 | 169.38 | 31.3 |
| 7 (5) | 2835.5 | 349.8 | 168.54 | 27.9 |
| 8 (8) | 2598.4 | 342.2 | 189.14 | 31.4 |
| 9 (9) | 2740.5 | 340.6 | 161.4 | 31.0 |
| 10 (15) | 2263.0 | 312.4 | 180.31 | 29.7 |

[1]Tensile strength divided by the basis weight times 102 by TAPPI Method T494.
[2]Tear Strength determined by TAPPI Method T414.
[3]Scott type internal bond strength using Tappi Method T569 pm-00.
[4]The percent ash content is the percent of material remaining after combusting the sample at 500° C. for 10 minutes using a microwave furnace.

We claim:

1. A process for preparing polysilicate gels comprising the steps of
    (a) contacting a first feed stream, wherein the first feed stream comprises a silica source selected from the group consisting of an aqueous solution of a water-soluble silicate, a colloidal silica sol and combinations thereof, with a second feed stream comprising $CO_2$ to form a reaction stream, and
    (b) maintaining a velocity and a turbulence of the reaction stream in a reaction vessel(s) with at least one propelling device wherein the propelling device propels the reaction stream of combined first and second feed streams at a turbulence of at least 2300 Reynolds number which propelling device is spaced at an interval in the reaction vessel(s) after the first and second feed streams are contacted.

2. The process according to claim 1, wherein the reaction stream is at a pressure of less than about 25 psig.

3. The process according to claim 1, wherein the second feed stream comprises free carbon dioxide or a pre-carbonated aqueous stream.

4. The process according to claim 1, further comprising pre-carbonating the second feed stream under a pressure equal to or greater than about 25 psig.

5. The process according to claim 1 further comprising diluting the formed polysilicate gel after formation thereof in the reaction vessel(s).

6. The process according to claim 1, wherein the silica source is an aqueous solution of the water soluble silicate and the concentration of silica in the first feed stream is in the range of about 0.5 to about 15% by weight of the first feed stream.

7. The process according to claim 1, wherein the process is continuous or batch.

8. The process according to claim 7, wherein the process is continuous.

9. The process according to claim 1, wherein the flow of the reaction stream is at least about 20 gallons per minute.

10. The process according to claim 9, wherein the flow of the reaction stream is at least about 30 gallons per minute.

11. The process according to claim 1, wherein the velocity of the reaction stream is at least about 4 ft/sec.

12. The process according to claim 1, wherein the propelled reaction stream is propelled at a rate to maintain a concentration of at least 2 g/L carbon dioxide in the reaction stream.

13. The process according to claim 1, wherein the reaction stream is maintained at a turbulence value of at least 3000 Reynolds number.

14. The process according to claim 1, wherein the carbon dioxide is present in at least an amount needed to neutralize the alkalinity of the said silica to a pH of about 8.5.

15. The process according to claim 1, wherein the reaction stream is propelled by pump(s) during step (b).

16. The process according to claim 1, wherein the carbon dioxide is dispersed in the reaction stream of an average bubble size of about $1 \times 10^{-3}$ L to about $5 \times 10^{-4}$ L.

17. The process according to claim 16, wherein the average bubble size is less than about $7 \times 10^{-4}$ L.

18. The process according to claim 1, wherein the reaction vessel(s) are selected from the group consisting of tubular reactors, pipes and hoses.

19. A process according to claim 3 wherein the pre-carbonated aqueous stream is pre-carbonated by a method comprising the steps of carbonating the second feed stream at a pressure of greater than or equal to at least about 25 psig, wherein the second feed stream is carbonated before combining with the first feed stream.

20. The process according the claim 19, wherein the carbon dioxide concentration in the aqueous solution after carbonating and before combining with the silicate or silica is at least 5 g/L.

21. The process according to claim 1, wherein at least one additional replenishment $CO_2$ stream is fed into the reaction stream and is spaced at an interval in the reaction vessel after the first and second feed stream in step (a) are contacted.

* * * * *

UNITED STATES PATENT AND TRADEMARK OFFICE
CERTIFICATE OF CORRECTION

PATENT NO. : 7,504,084 B2 Page 1 of 1
APPLICATION NO. : 11/292012
DATED : March 17, 2009
INVENTOR(S) : Walter N. Simmons et al.

It is certified that error appears in the above-identified patent and that said Letters Patent is hereby corrected as shown below:

On title page

Item (73) should read:

-- (73) Assignee: Ciba Specialty Chemicals Water Treatments Limited
  Bradford, UNITED KINGDOM --.

Signed and Sealed this

First Day of June, 2010

David J. Kappos
*Director of the United States Patent and Trademark Office*